United States Patent
Chen et al.

(10) Patent No.: US 9,378,538 B2
(45) Date of Patent: Jun. 28, 2016

(54) IMAGE INTERPOLATION METHOD AND IMAGE INTERPOLATION DEVICE AND IMAGE APPARATUS USING THE SAME

(71) Applicant: National Central University, Taoyuan County (TW)

(72) Inventors: Ching-Han Chen, Taoyuan County (TW); Chia-Ming Kuo, Kaohsiung (TW)

(73) Assignee: NATIONAL CENTRAL UNIVERSITY, Taoyuan County (TW)

( * ) Notice: Subject to any disclaimer, the term of this patent is extended or adjusted under 35 U.S.C. 154(b) by 330 days.

(21) Appl. No.: 14/060,687

(22) Filed: Oct. 23, 2013

(65) Prior Publication Data
US 2015/0016749 A1    Jan. 15, 2015

(30) Foreign Application Priority Data
Jul. 12, 2013   (TW) .............................. 102125102 A (51) Int. Cl.
| | | |
|---|---|---|
| *G06K 9/32* | (2006.01) | |
| *G06T 3/40* | (2006.01) | |
| *G06T 5/00* | (2006.01) | |
| *G06T 5/20* | (2006.01) | |
| *G06N 3/04* | (2006.01) | |
| *G06N 3/08* | (2006.01) | |

(52) U.S. Cl.
CPC ............ *G06T 3/4007* (2013.01); *G06N 3/0472* (2013.01); *G06N 3/086* (2013.01); *G06T 3/403* (2013.01); *G06T 5/002* (2013.01); *G06T 5/20* (2013.01); *G06T 2200/12* (2013.01); *G06T 2207/20076* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 6,289,112 | B1 * | 9/2001 | Jain ..................... | G06K 9/00087 382/116 |
| 2005/0078884 | A1 * | 4/2005 | Yi .......................... | G06T 3/4007 382/300 |
| 2011/0176744 | A1 * | 7/2011 | Ko ......................... | G06T 3/4007 382/264 |
| 2013/0242133 | A1 * | 9/2013 | Li ......................... | H04N 5/2355 348/229.1 |
| 2014/0169701 | A1 * | 6/2014 | Cui ...................... | G06T 3/4053 382/299 |

* cited by examiner

*Primary Examiner* — Stephen R Koziol
*Assistant Examiner* — David Perlman
(74) *Attorney, Agent, or Firm* — WPAT, PC; Justin King; Douglas Hosack (57) ABSTRACT

An image interpolation method and an image interpolation device and an image apparatus using the image interpolation method are provided. The image interpolation method uses a probabilistic neural network model to perform an adaptive interpolation on an image. The image interpolation method includes the following steps. Firstly, plural reference points neighboring an interpolation point are selected. Then, an anisotropic Gaussian function value of each reference point of the plural reference points is obtained according to an edge direction angle, a horizontal smoothing parameter, a vertical smoothing parameter and a distance between each reference point and the interpolation point. Afterwards, a statistics method is performed to integrate and compute the anisotropic Gaussian function values of the plural reference points, thereby obtaining an interpolation value of the interpolation point.

9 Claims, 8 Drawing Sheets

IMAGE INTERPOLATION METHOD AND IMAGE INTERPOLATION DEVICE AND IMAGE APPARATUS USING THE SAME

FIELD OF THE INVENTION

The present invention relates to an image processing method, and more particularly to an image interpolation method.

BACKGROUND OF THE INVENTION

Image interpolation is a popular technique for manipulating and processing images. One of the widely-used applications of the image interpolation techniques is to provide enhanced visual effects after a digital image is scaled up or scaled down. Consequently, the efficacy of displaying or printing the image is enhanced. In recent years, the increasing popularity of consumer multimedia products has made imaging devices or display devices (e.g. flat display devices or digital cameras) ubiquitous. As a result, the image interpolation technique is becoming increasingly important.

For example, since the size and the resolution of the flat display devices are gradually increased and the demands on full-screen display modes are increased, the image interpolation technique becomes a necessary procedure. As known, if the resolution of the image inputted into the flat display device is too low and the size of the flat display device is too large, the image interpolation technique becomes more important. In this situation, if the image interpolation method is not done, the full-screen image is blurry during image visualization. The blurry image is detrimental to observation. Moreover, the image interpolation technique is also helpful for the operations of other image input devices. For example, the image interpolation technique is helpful for increasing the resolution of scanners or the zooming functions of digital cameras.

FIG. 1 schematically illustrates some image interpolation results obtained by some conventional image interpolation methods. In FIG. 1A, an original image is shown. After a high resolution original image is sampled as a low resolution target image, the image interpolation result of FIG. 1B is obtained by a nearest neighbor interpolation method. After a high resolution original image is sampled as a low resolution target image, the image interpolation result of FIG. 1C is obtained by a bi-linear interpolation method. After a high resolution original image is sampled as a low resolution target image, the image interpolation result of FIG. 1D is obtained by a bi-cubic interpolation method.

From FIG. 1, it is found that the conventional image interpolation methods have some drawbacks. For example, the features of the interpolated image usually have obvious aliasing and blocking effects. In addition, the features of the interpolated image (e.g. the edge features and the line features of the image) produce a blurry effect. Consequently, the interpolated image is suffered from a defocus problem during image visualization.

Figure 1A:
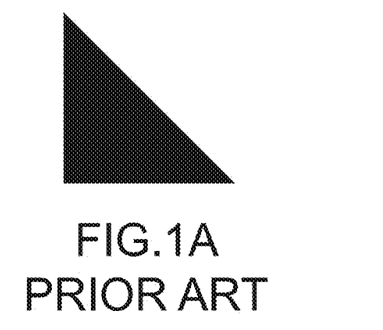
FIGS. 1A to 1D schematically illustrate some image interpolation results obtained by some conventional image interpolation methods.
Figure 1B:
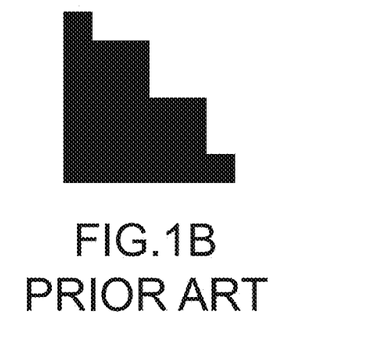
Figure 1C:
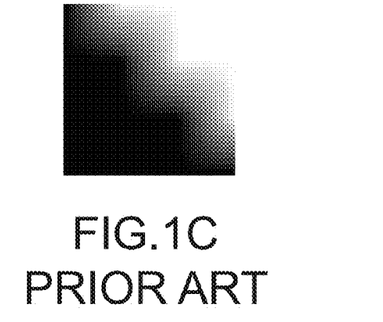
Figure 1D:
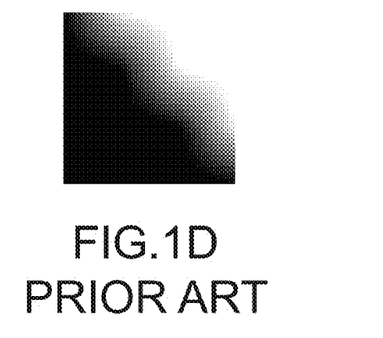
Figure 2:
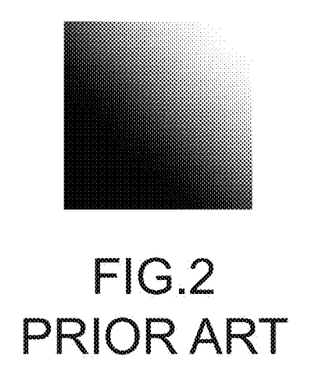
FIG. 2 schematically illustrates an image interpolation result obtained by a conventional image interpolation method based on a probabilistic neural network (PNN)

For solving the above drawbacks, an image interpolation method based on a probabilistic neural network (PNN) has been disclosed. FIG. 2 schematically illustrates an image interpolation result obtained by a conventional image interpolation method based on a probabilistic neural network (PNN). By comparing the image interpolation results of FIGS. 1 and 2, it is found that the PNN method can achieve the better image interpolation result. Generally, the probabilistic neural network uses a Gaussian function as a kernel. Since the Gaussian kernel function has isotropic characteristics and low pass filter characteristics, the sharpness characteristics in the edge region with drastic gray level variation are not very obvious. Consequently, the edge features and the line features of the interpolated image are slightly suffered from a defocus problem during image visualization.

Figure 3:
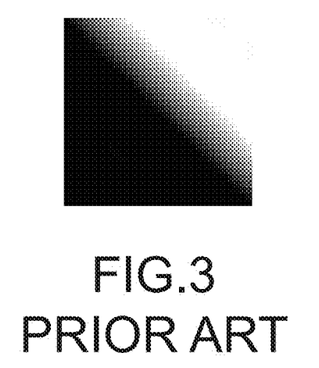
FIG. 3 schematically illustrates an image interpolation result obtained by a conventional image interpolation method based on an adaptive probabilistic neural network (APNN)

For solving the above drawbacks, an image interpolation method based on an adaptive probabilistic neural network (APNN) has been disclosed. FIG. 3 schematically illustrates an image interpolation result obtained by a conventional image interpolation method based on an adaptive probabilistic neural network (APNN). By comparing the image interpolation results of FIGS. 2 and 3, it is found that the APNN method can achieve the better sharpness enhancement.

Since the APNN method calculates the edge direction angles, the Gaussian function has anisotropic characteristics. Under this circumstance, the interpolated values of the interpolation points are closer to the edge characteristics of the original image. However, the Gaussian function parameters corresponding to plural neighboring reference points of the interpolation point are obtained along an identical edge direction angle (e.g. along the edge direction angle of the interpolation point). Under this circumstance, the interpolated values of the interpolation points still fail to approach the edge characteristics of the original image. In other words, the interpolated image of FIG. 3 is still slightly blurry.

Therefore, there is a need of providing an improved image interpolation method.

SUMMARY OF THE INVENTION

The present invention relates to an image interpolation method, and more particularly to an image interpolation method based on a probabilistic neural network (PNN) model.

The present invention also relates to an image interpolation device, and more particularly to an image interpolation device using the image interpolation method of the present invention.

The present invention further relates to an image apparatus, and more particularly to an image apparatus with an image interpolation function.

In accordance with an aspect of the present invention, there is provided an image interpolation method for using a probabilistic neural network model to perform an adaptive interpolation on an interpolation point of an image. The image interpolation method includes the following steps. Firstly, in a step (1), plural reference points neighboring the interpolation point are selected. Then, in a step (2), an anisotropic Gaussian function value of each reference point of the plural reference points is obtained according to an edge direction angle, a horizontal smoothing parameter, a vertical smoothing parameter and a distance between each reference point and the interpolation point. Afterwards, in a step (3), a statistics method is performed to integrate and compute the anisotropic Gaussian function values of the plural reference points, thereby obtaining an interpolation value of the interpolation point.

In an embodiment, the statistics method in the step (3) is a maximum value method, a median method or a quartile method.

In an embodiment, the step (2) includes sub-steps of (2-1) obtaining a horizontal gradient value and a vertical gradient value of each reference point by a gradient operator, and (2-2) obtaining the edge direction angle of each reference point according to the horizontal gradient value and the vertical gradient value of each reference point.

In an embodiment, the gradient operator in the step (2-1) is a sobel operator, a Prewitt operator, a central difference operator, an intermediate difference operator, a Scharr operator, or a Roberts operator.

In an embodiment, in the step (2-2), the horizontal gradient value and the vertical gradient value of each reference point are inputted into and computed by a Rao algorithm, so that the edge direction angle of each reference point is obtained.

In an embodiment, in the step (2), plural characteristic values of each reference point are inputted into a single-neuron neural network for obtaining the horizontal gradient value and the vertical gradient value of each reference point. A transfer function of the single-neuron neural network is a linear function, a sigmoid transfer function or a hyperbolic tangent function. An independent variable of the transfer function is expressed as:

Σ(each characteristic value)×(a weight corresponding to each characteristic value)+(a bias value).

In an embodiment, in the step (2), an optimization algorithm is performed to obtain at least one parameter of the transfer function, the weight corresponding to each characteristic value and the bias value.

In an embodiment, the optimization algorithm is a particle swarm optimization (PSO) algorithm or a genetic algorithm (GA).

In an embodiment, in the step (2), a peak signal-to-noise ratio (PSNR) or a percentage edge error (PEE) is used as a fitness function for the optimization algorithm.

In an embodiment, the plural characteristic values of each reference point comprise a horizontal gradient value and a vertical gradient value.

In an embodiment, in the step (3), the interpolation value of the interpolation point is expressed as:

Σ(a signal value of each reference point)×(the anisotropic Gaussian function value of each reference point)/Σ(the anisotropic Gaussian function value of each reference point).

In an embodiment, the signal value of each reference point is a gray value of each reference point.

In accordance with another aspect of the present invention, there is provided an image interpolation device for using a probabilistic neural network model to perform an adaptive interpolation on an interpolation point of an image. The image interpolation device includes a data storage and control unit, at least one Gaussian function computing unit, and a statistics computing unit. The data storage and control unit is used for obtaining edge direction angles, horizontal smoothing parameters and vertical smoothing parameters of plural reference points neighboring the interpolation point. The at least one Gaussian function computing unit is connected with the data storage and control unit for obtaining an anisotropic Gaussian function value of each reference point of the plural reference points according to the corresponding edge direction angle, the corresponding horizontal smoothing parameter, the corresponding vertical smoothing parameter and a distance between each reference point and the interpolation point. The statistics computing unit is connected with the Gaussian function computing unit for performing a statistics method to integrate and compute the anisotropic Gaussian function values of the plural reference points, thereby generating and outputting an interpolation value of the interpolation point.

In an embodiment, the at least one Gaussian function computing unit includes plural Gaussian function computing units corresponding to the plural reference points. Each of the plural Gaussian function computing units obtains the anisotropic Gaussian function value of the corresponding reference point according to the corresponding edge direction angle, the corresponding horizontal smoothing parameter, the corresponding vertical smoothing parameter and the distance between the corresponding reference point and the interpolation point. Alternatively, the plural reference points are divided into plural reference point groups, and the at least one Gaussian function computing unit includes plural Gaussian function computing units corresponding to the plural reference point groups. Each of the plural Gaussian function computing units obtains the anisotropic Gaussian function values of the reference points of the corresponding reference point group according to the corresponding edge direction angles, the corresponding horizontal smoothing parameters, the corresponding vertical smoothing parameters and the distances between the corresponding reference points and the interpolation point. Alternatively, the at least one Gaussian function computing unit includes a single Gaussian function computing unit. The single Gaussian function computing unit obtains the anisotropic Gaussian function values of the plural reference points sequentially according to the corresponding edge direction angles, the corresponding horizontal smoothing parameters, the corresponding vertical smoothing parameters and the distances between the corresponding reference points and the interpolation point.

In an embodiment, each Gaussian function computing unit of the at least one Gaussian function computing unit includes an index computing unit and an index function computing unit. The index function computing unit is connected between the index computing unit and the statistics computing unit, wherein the index computing unit generates and outputs an index value to the index function computing unit.

In an embodiment, the index computing unit includes a distance computing unit. The distance computing unit is connected with the index computing unit for receiving a position coordinate of the interpolation point, thereby generating and outputting a horizontal distance value and a vertical distance value between the corresponding reference point and the interpolation point.

In an embodiment, the index computing unit includes a rotation unit for receiving a horizontal distance value, a vertical distance value and an edge direction angle, and performing a coordinate rotation computation according to the edge direction angle, so that the horizontal distance value is transformed into an additional horizontal distance value and the vertical distance value is transformed into an additional vertical distance value.

In an embodiment, the rotation unit includes a coordinate rotation digital computer (CORDIC) for performing the coordinate rotation computation. Alternatively, the rotation unit has a coordinate rotation table, and the rotation unit performs the coordinate rotation computation according to the coordinate rotation table. Alternatively, the rotation unit performs the coordinate rotation computation according to a Taylor series expansion. Alternatively, the rotation unit has the coordinate rotation table, and the rotation unit performs the coordinate rotation computation according to the coordinate rotation table and the Taylor series expansion. Alternatively, the rotation unit includes the coordinate rotation digital computer and the coordinate rotation table, and the rotation unit performs the coordinate rotation computation according to the coordinate rotation digital computer and the coordinate rotation table.

In an embodiment, the index function computing unit includes an integer index function computing unit, a decimal fraction index function computing unit, and a multiplication computing unit. The multiplication computing unit is connected with the integer index function computing unit and the decimal fraction index function computing unit. The index value is divided into an integer index value and a decimal fraction index value. The integer index function computing unit receives the integer index value and generates an integer index function value. The decimal fraction index function computing unit receives the decimal fraction index value and generates a decimal fraction index function value. The multiplication computing unit receives the integer index function value and the decimal fraction index function value, and generates a product of the integer index function value and the decimal fraction index function value.

In an embodiment, the integer index function computing unit has an integer index function table. After the integer index value is received by the integer index function computing unit, the integer index function computing unit generates and outputs the integer index function value according to the integer index function table.

In an embodiment, the decimal fraction index function computing unit includes a coordinate rotation digital computer (CORDIC) for performing an index computation after the decimal fraction index value is received by the decimal fraction index function computing unit. Alternatively, the decimal fraction index function computing unit has a decimal fraction index function table, and the decimal fraction index function computing unit generates and outputs the decimal fraction index function value according to the decimal fraction index function table after the decimal fraction index value is received. Alternatively, the decimal fraction index function computing unit generates and outputs the decimal fraction index function value according to a Taylor series expansion after the decimal fraction index value is received. Alternatively, the decimal fraction index function computing unit has the decimal fraction index function table, and the decimal fraction index function computing unit generates and outputs the decimal fraction index function value according to the decimal fraction index function table and the Taylor series expansion after the decimal fraction index value is received. Alternatively, the decimal fraction index function computing unit includes the coordinate rotation digital computer (CORDIC) and the decimal fraction index function table, and the decimal fraction index function computing unit generates and outputs the decimal fraction index function value according to the index computation of the coordinate rotation digital computer (CORDIC) and the decimal fraction index function table.

In an embodiment, the image interpolation device is implemented by a field-programmable gate array (FPGA).

In an embodiment, the edge direction angles, the horizontal smoothing parameters and the vertical smoothing parameters of the plural reference points neighboring the interpolation point are calculated by the data storage and control unit. Alternatively, the edge direction angles, the horizontal smoothing parameters and the vertical smoothing parameters of the plural reference points neighboring the interpolation point are calculated by a front-end computing unit, which is connected to the data storage and control unit.

In an embodiment, the statistics method is a maximum value method, a median method or a quartile method.

In accordance with a further aspect of the present invention, there is provided an image apparatus with an image interpolation function. The image apparatus includes an image receiving module, an image interpolation module, and an image output module. The image receiving module is used for receiving a target image. The image interpolation module is connected with the image receiving module for using a probabilistic neural network model to perform an adaptive interpolation on at least one interpolation point of the object image, thereby generating an interpolated image. The image interpolation module includes a data storage and control unit, at least one Gaussian function computing unit, and a statistics computing unit. The data storage and control unit is used for obtaining edge direction angles, horizontal smoothing parameters and vertical smoothing parameters of plural reference points neighboring the at least one interpolation point. The at least one Gaussian function computing unit is connected with the data storage and control unit for obtaining an anisotropic Gaussian function value of each reference point of the plural reference points according to the corresponding edge direction angle, the corresponding horizontal smoothing parameter, the corresponding vertical smoothing parameter and a distance between each reference point and the interpolation point. The statistics computing unit is connected with the Gaussian function computing unit for performing a statistics method to integrate and compute the anisotropic Gaussian function values of the plural reference points, thereby generating and outputting an interpolation value of the interpolation point. The image output module is connected with the image interpolation module for outputting the interpolated image.

In an embodiment, the image apparatus with the image interpolation function is a digital set-top box, a multimedia gateway or a multimedia transmission device, or the image apparatus with the image interpolation function is included in a multimedia playback device or an image pickup device.

In an embodiment, the at least one Gaussian function computing unit includes plural Gaussian function computing units corresponding to the plural reference points. Each of the plural Gaussian function computing units obtains the anisotropic Gaussian function value of the corresponding reference point according to the corresponding edge direction angle, the corresponding horizontal smoothing parameter, the corresponding vertical smoothing parameter and the distance between the corresponding reference point and the interpolation point. Alternatively, the plural reference points are divided into plural reference point groups, and the at least one Gaussian function computing unit includes plural Gaussian function computing units corresponding to the plural reference point groups. Each of the plural Gaussian function computing units obtains the anisotropic Gaussian function values of the reference points of the corresponding reference point group according to the corresponding edge direction angles, the corresponding horizontal smoothing parameters, the corresponding vertical smoothing parameters and the distances between the corresponding reference points and the interpolation point. Alternatively, the at least one Gaussian function computing unit includes a single Gaussian function computing unit. The single Gaussian function computing unit obtains the anisotropic Gaussian function values of the plural reference points sequentially according to the corresponding edge direction angles, the corresponding horizontal smoothing parameters, the corresponding vertical smoothing parameters and the distances between the corresponding reference points and the interpolation point.

In an embodiment, each Gaussian function computing unit of the at least one Gaussian function computing unit includes an index computing unit and an index function computing unit. The index function computing unit is connected between the index computing unit and the statistics computing unit, wherein the index computing unit generates and outputs an index value to the index function computing unit.

In an embodiment, the index computing unit includes a distance computing unit. The distance computing unit is connected with the index computing unit for receiving a position coordinate of the at least one interpolation point, thereby generating and outputting a horizontal distance value and a vertical distance value between the corresponding reference point and the at least one interpolation point.

In an embodiment, the index computing unit includes a rotation unit for receiving a horizontal distance value, a vertical distance value and an edge direction angle, and performing a coordinate rotation computation according to the edge direction angle, so that the horizontal distance value is transformed into an additional horizontal distance value and the vertical distance value is transformed into an additional vertical distance value.

In an embodiment, the rotation unit includes a coordinate rotation digital computer (CORDIC) for performing the coordinate rotation computation. Alternatively, the rotation unit has a coordinate rotation table, and the rotation unit performs the coordinate rotation computation according to the coordinate rotation table. Alternatively, the rotation unit performs the coordinate rotation computation according to a Taylor series expansion. Alternatively, the rotation unit has the coordinate rotation table, and the rotation unit performs the coordinate rotation computation according to the coordinate rotation table and the Taylor series expansion. Alternatively, the rotation unit includes the coordinate rotation digital computer and the coordinate rotation table, and the rotation unit performs the coordinate rotation computation according to the coordinate rotation digital computer and the coordinate rotation table.

In an embodiment, the index function computing unit includes an integer index function computing unit, a decimal fraction index function computing unit, and a multiplication computing unit. The multiplication computing unit is connected with the integer index function computing unit and the decimal fraction index function computing unit. The index value is divided into an integer index value and a decimal fraction index value. The integer index function computing unit receives the integer index value and generates an integer index function value. The decimal fraction index function computing unit receives the decimal fraction index value and generates a decimal fraction index function value. The multiplication computing unit receives the integer index function value and the decimal fraction index function value and generates a product of the integer index function value and the decimal fraction index function value.

In an embodiment, the integer index function computing unit has an integer index function table. After the integer index value is received by the integer index function computing unit, the integer index function computing unit generates and outputs the integer index function value according to the integer index function table.

In an embodiment, the decimal fraction index function computing unit includes a coordinate rotation digital computer (CORDIC) for performing an index computation after the decimal fraction index value is received by the decimal fraction index function computing unit. Alternatively, the decimal fraction index function computing unit has a decimal fraction index function table, and the decimal fraction index function computing unit generates and outputs the decimal fraction index function value according to the decimal fraction index function table after the decimal fraction index value is received. Alternatively, the decimal fraction index function computing unit generates and outputs the decimal fraction index function value according to a Taylor series expansion after the decimal fraction index value is received. Alternatively, the decimal fraction index function computing unit has the decimal fraction index function table, and the decimal fraction index function computing unit generates and outputs the decimal fraction index function value according to the decimal fraction index function table and the Taylor series expansion after the decimal fraction index value is received. Alternatively, the decimal fraction index function computing unit includes the coordinate rotation digital computer (CORDIC) and the decimal fraction index function table. The decimal fraction index function computing unit generates and outputs the decimal fraction index function value according to the index computation of the coordinate rotation digital computer (CORDIC) and the decimal fraction index function table.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides an image interpolation method. The image interpolation method uses a probabilistic neural network (PNN) model to perform an adaptive interpolation on an interpolation point. The PNN model has the architecture of a feed-forward neural network. Since it is not necessary to undergo an iterative learning process, the operations of the PNN model are faster than other type neural networks.

Figure 4:
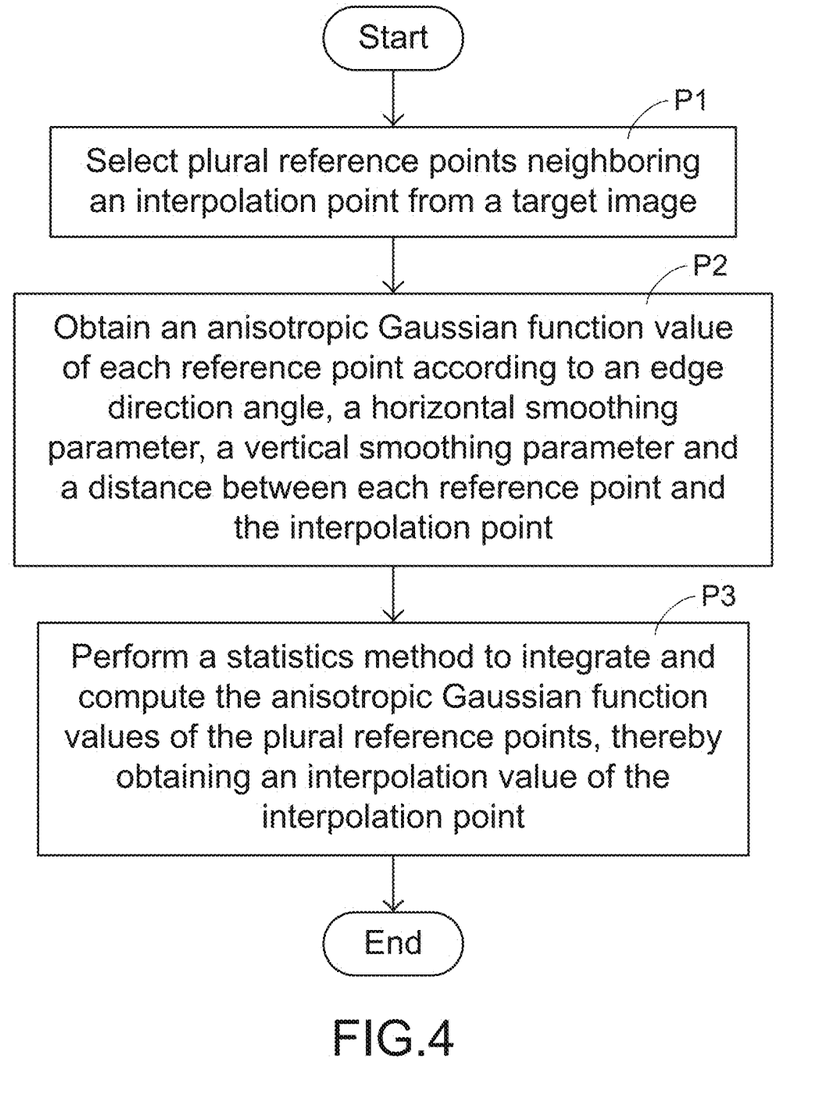
FIG. 4 is a flowchart illustrating an image interpolation method according to an embodiment of the present invention.
Figure 5:
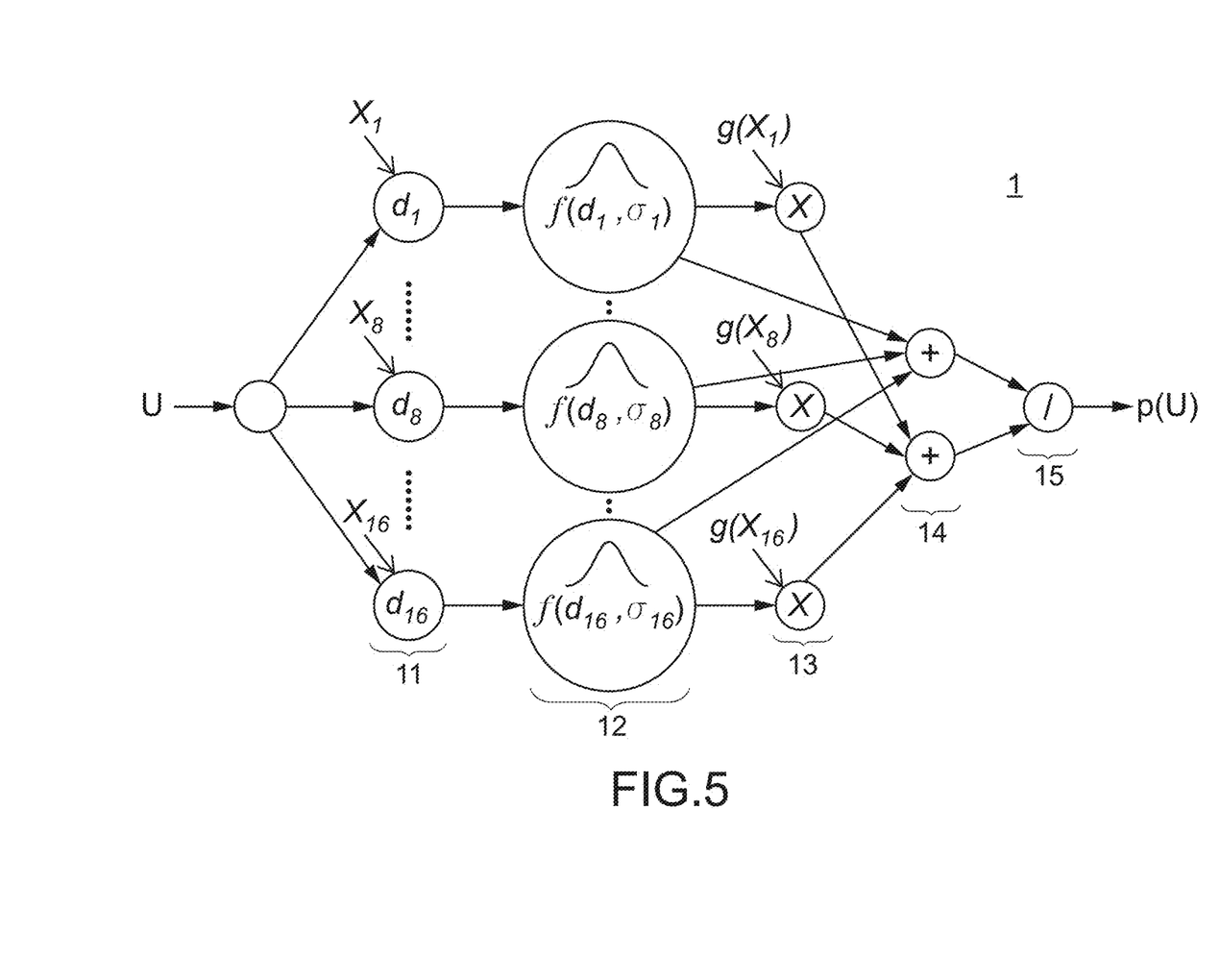
FIG. 5 schematically illustrates the architecture of a probabilistic neural network model by using the image interpolation method of FIG. 4.
Figure 6:
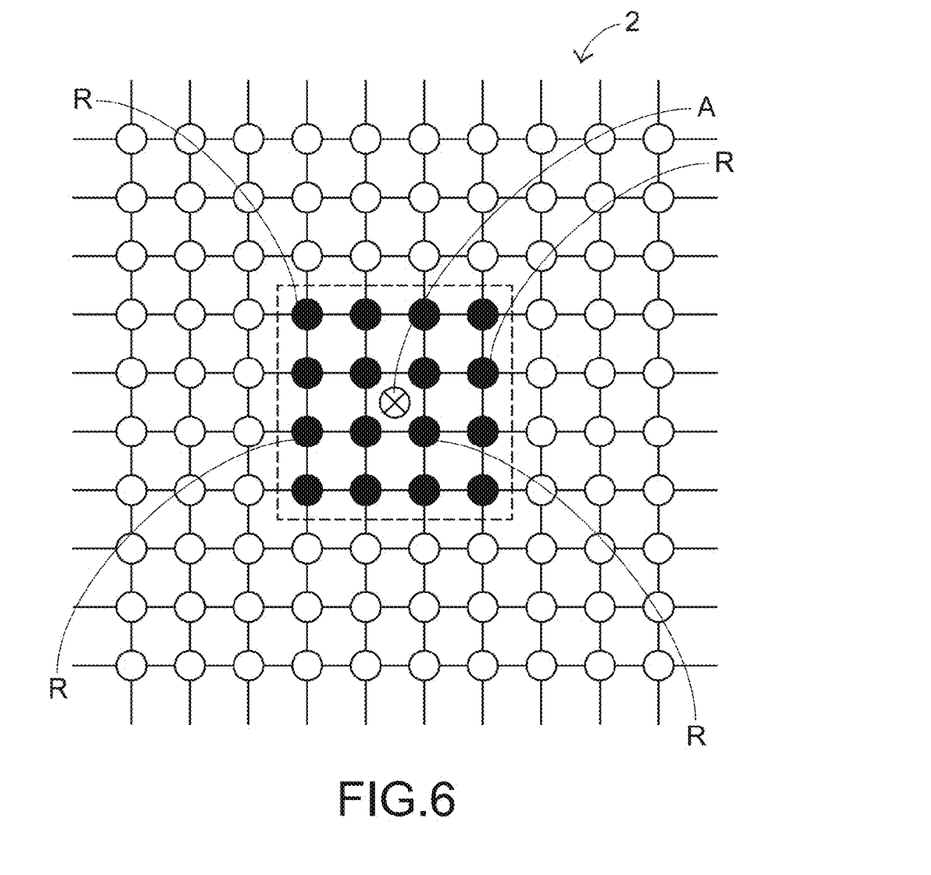
FIG. 6 schematically illustrates the relationships between the position of an interpolation point and the positions of plural reference points R by using the image interpolation method of FIG. 4.

Please refer to FIGS. 4-6. FIG. 4 is a flowchart illustrating an image interpolation method according to an embodiment of the present invention. FIG. 5 schematically illustrates the architecture of a probabilistic neural network model by using the image interpolation method of FIG. 4. FIG. 6 schematically illustrates the relationships between the position of an interpolation point and the positions of plural reference points R by using the image interpolation method of FIG. 4.

In this embodiment, the probabilistic neural network model 1 is a network model consisting of five neural layers: a Euclidian layer 11, a Gaussian layer 12, a weighting layer 13, a summation layer 14, and a division layer 15. The flowchart of the image interpolation method will be illustrated in more details as follows.

Firstly, in the step P1, plural reference points R neighboring an interpolation point A are selected from a target image 2. In this embodiment, there are sixteen reference points R. However, those skilled in the art will readily observe that the number of the reference points R may be varied according to the practical requirements.

Then, in the step P2, the distance $d_1 \sim d_{16}$ between each reference point R and the interpolation point A is calculated according to an edge direction angle $\theta_1 \sim \theta_{16}$, a horizontal smoothing parameter $\sigma_{x_1} \sim \sigma_{x_{16}}$, a vertical smoothing parameter $\sigma_{y_1} \sim \sigma_{y_{16}}$ of each reference point R, and an anisotropic Gaussian function value $f(d_1, \sigma_1) \sim f(d_{16}, \sigma_{16})$ of each reference point R is obtained according to the distance $d_1 \sim d_{16}$. The detailed description of this step will be illustrated later.

Then, in the step P3, a statistics method is performed to integrate and compute all of the anisotropic Gaussian function value $f(d_1, \sigma_1) \sim f(d_{16}, \sigma_{16})$ from the step P2, thereby obtaining an interpolation value p(U) of the interpolation point A. In this embodiment, the statistics method is a center-of-gravity method. It is noted that numerous modifications and alterations of the statistics method may be made while retaining the teachings of the invention. For example, in some other embodiments, the statistics method is a maximum value method, a median method or a quartile method.

In particular, the Euclidian layer 11 of the probabilistic neural network model 1 is used to calculate the distance $d_1 \sim d_{16}$ between each reference point R and the interpolation point A in the step P2. In addition, the distance $d_1 \sim d_{16}$ is inputted into the Gaussian layer 12. The distance may be expressed by the following equation:

$$d_i = \|U - X_i\|, i = 1 \sim 16;$$

wherein U indicates the coordinate of the interpolation point A, and $X_1 \sim X_{16}$ indicate the coordinates of the sixteen reference points R, respectively.

In addition, each distance $d_i$ may be further divided into a horizontal distance value $x_i$ and a vertical distance value $y_i$.

Moreover, the Gaussian layer 12 in the probabilistic neural network model 1 is used to calculate the anisotropic Gaussian function value $f(d_1, \sigma_1) \sim f(d_{16}, \sigma_{16})$ of each reference point R in the step P2 according to an anisotropic Gaussian function $f(d, \sigma)$. The anisotropic Gaussian function $f(d, \sigma)$ is expressed by the following equation:

$$f(d_i, \sigma_i) = g_\theta(x_i, y_i, \sigma_{x_i}, \sigma_{y_i}, \theta_i) = \frac{1}{2\pi\sigma_{x_i}\sigma_{y_i}} e^{-\frac{1}{2}\left(\frac{u_i^2}{\sigma_{x_i}^2} + \frac{v_i^2}{\sigma_{y_i}^2}\right)},$$

$$\begin{pmatrix} u_i \\ v_i \end{pmatrix} = \begin{bmatrix} \cos\theta_i & \sin\theta_i \\ -\sin\theta_i & \cos\theta_i \end{bmatrix} \begin{pmatrix} x_i \\ y_i \end{pmatrix}, i = 1 \sim 16;$$

wherein $\sigma_{x_1} \sim \sigma_{x_{16}}$ indicate respective horizontal smoothing parameters of the sixteen reference points R, $\sigma_{y_1} \sim \sigma_{y_{16}}$ indicate respective vertical smoothing parameters of the sixteen reference points R, $\theta_1 \sim \theta_{16}$ indicate respective edge direction angles of the sixteen reference points R, $u_1 \sim u_{16}$ indicate respective horizontal distance values of the sixteen reference points R after a coordinate transformation (also referred as additional horizontal distance values), and $v_1 \sim v_{16}$ indicate respective vertical distance values of the sixteen reference points R after a coordinate transformation (also referred as additional vertical distance values).

From the above discussions, the image interpolation method of the present invention should utilize the anisotropic Gaussian function values $f(d_1, \sigma_1) \sim f(d_{16}, \sigma_{16})$ of the sixteen reference points R. Moreover, before the anisotropic Gaussian function values $\theta(d_1, \sigma_1) \sim f(d_{10}, \sigma_{16})$ of the sixteen reference points R are calculated, the horizontal distance values $x_1 \sim x_{16}$, the vertical distance values $y_1 \sim y_{16}$, the horizontal smoothing parameter $\sigma_{x_1} \sim \sigma_{x_{16}}$, the vertical smoothing parameters $\sigma_{y_1} \sim \sigma_{y_{16}}$ and the edge direction angles $\theta_1 \sim \theta_{16}$ of the sixteen reference points R should be obtained. The horizontal distance values $x_1 \sim x_{16}$ and the vertical distance values $y_1 \sim y_{16}$ have been obtained by using the Euclidian layer 11.

Hereinafter, a way of obtaining the edge direction angles $\theta_1 \sim \theta_{16}$ of the sixteen reference points R in the step P2 of the image interpolation method of the present invention will be described. In this embodiment, the edge direction angles $\theta_1 \sim \theta_{16}$ of the sixteen reference points R may be obtained by using a Rao algorithm. In accordance with the Rao algorithm, the input image is divided into plural sliding blocks, wherein each of the sliding blocks has a size of w×w. Consequently, the edge direction angles $\theta_1 \sim \theta_{16}$ may be expressed by the following formula:

$$\theta_i = \frac{1}{2}\tan^{-1}\left(\frac{\sum_{m=1}^{\omega}\sum_{n=1}^{\omega} 2G_{x_i}(m,n)G_{y_i}(m,n)}{\sum_{m=1}^{\omega}\sum_{l=1}^{\omega} [G_{x_i}^2(m,n) - G_{y_i}^2(m,n)]}\right), i = 1 \sim 16;$$

wherein $G_{x_1} \sim G_{x_{16}}$ indicate respective horizontal gradient values of the sixteen reference points R, and $G_{y_1} \sim G_{y_{16}}$ indicate respective vertical gradient values of the sixteen reference points R.

The applications of the Rao algorithm to the image interpolation method of the present invention are presented herein for purpose of illustration and description only. The principles of the Rao algorithm are well known to those skilled in the art, and are not redundantly described herein. Moreover, the Rao algorithm is an exemplary approach of obtaining the edge direction angle. However, those skilled in the art will readily observe that the edge direction angles $\theta_1 \sim \theta_{16}$ of the reference points R may be obtained by performing other kinds of algorithms according to the horizontal gradient values $G_{x_1} \sim G_{x_{16}}$ and the vertical gradient values $G_{y_1} \sim G_{y_{16}}$ of the sixteen reference points R. Alternatively, the edge direction angles $\theta_1 \sim \theta_{16}$ of the reference points R may be obtained by performing other kinds of algorithms without the need of referring to the horizontal gradient values and the vertical gradient values.

Moreover, in the step P2, a gradient operator is used to obtain the horizontal gradient values $G_{x_1} \sim G_{x_{16}}$ and the vertical gradient values $G_{y_1} \sim G_{y_{16}}$ of the sixteen reference points R. In this embodiment, a sobel operator is used to obtain these horizontal gradient values $G_{x_1} \sim G_{x_{16}}$ and these vertical gradient values $G_{y_1} \sim G_{y_{16}}$. Consequently, the horizontal gradient values $G_{x_1} \sim G_{x_{16}}$ and the vertical gradient values $G_{y_1} \sim G_{y_{16}}$ of the sixteen reference points R may be expressed by the following formulas:

$$G_{x_i}(m_i, n_i) = Sobel_x * F(m_i, n_i);$$

$$G_{y_i}(m_i, n_i) = Sobel_y * F(m_i, n_i)$$

$$Sobel_x = \begin{bmatrix} -1 & 0 & 1 \\ -2 & 0 & 2 \\ -1 & 0 & 1 \end{bmatrix},$$

$$Sobel_y = \begin{bmatrix} -1 & -2 & -1 \\ 0 & 0 & 0 \\ 1 & 2 & 1 \end{bmatrix},$$

$$i = 1 \sim 16;$$

wherein $F(m_i,n_i)$ indicate the neighboring pixel values of a pixel $(m_i,n_i)$, and * denotes the two-dimensional spatial convolution. Moreover, $Sobel_x$ and $Sobel_y$ indicate a horizontal sobel operator and a vertical sobel operator, respectively.

The applications of the sobel operator to the image interpolation method of the present invention are presented herein for purpose of illustration and description only. The principles of the sobel operator are well known to those skilled in the art, and are not redundantly described herein. Moreover, the sobel operator is an exemplary approach of obtaining the gradient operator. However, those skilled in the art will readily observe that the gradient operator may be modified according to the practical requirements. For example, in some other embodiments, a Prewitt operator, a central difference operator, an intermediate difference operator, a Scharr operator, a Roberts operator or any other gradient operator may be used to obtain the horizontal gradient values and the vertical gradient values of the reference points R.

Hereinafter, a way of obtaining the horizontal smoothing parameters $\sigma_{x_1} \sim \sigma_{x_{16}}$ and the vertical smoothing parameters $\sigma_{y_1} \sim \sigma_{y_{16}}$ of the sixteen reference points R in the step P2 of the image interpolation method of the present invention will be described. In this embodiment, plural characteristic values of all reference points R are inputted into a single-neuron neural network in order to obtain the horizontal smoothing parameters $\sigma_{x_1} \sim \sigma_{x_{16}}$ and the vertical smoothing parameters $\sigma_{y_1} \sim \sigma_{y_{16}}$ of the sixteen reference points R.

Figure 7:
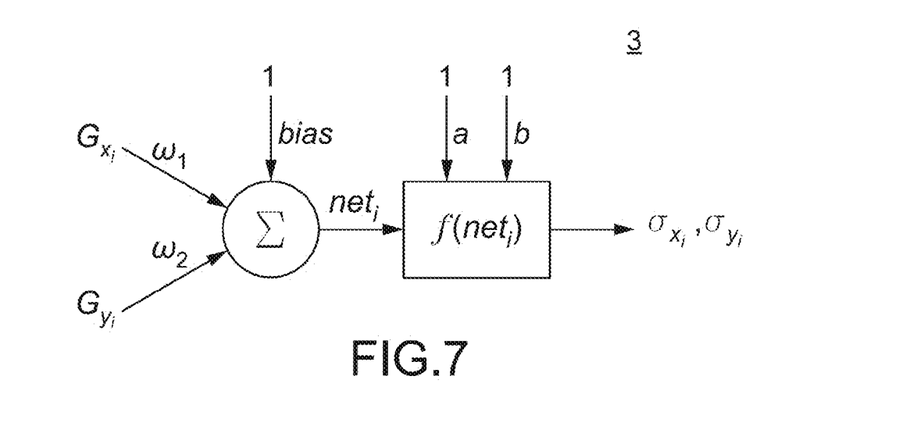
FIG. 7 schematically illustrates the architecture of a single-neuron neural network according to an embodiment of the present invention.

FIG. 7 schematically illustrates the architecture of a single-neuron neural network according to an embodiment of the present invention. In this embodiment, plural characteristic values of the reference point R include the horizontal gradient value $G_x$ and the vertical gradient value $G_y$ of the reference point R. In particular, the input values of the single-neuron neural network 3 are the horizontal gradient value $G_x$ and the vertical gradient value $G_y$, and the output values of the single-neuron neural network 3 are the horizontal smoothing parameter $\sigma_x$ and the vertical smoothing parameter $\sigma_y$. Moreover, a transfer function of the single-neuron neural network 3 is a sigmoid transfer function, which may be expressed by the following equation:

$$f(net_i) = \frac{a}{1 + e^{-b*net_i}},$$

$$net_i = G_{x_i} \cdot \omega_1 + G_{y_i} \cdot \omega_2 + bias;$$

$$i = 1 \sim 16;$$

wherein $net_i$ denotes an independent variable of the transfer function $f(net_i)$, $\omega_1$ and $\omega_2$ denote the weights of the horizontal gradient value $G_{x_i}$ and the vertical gradient value $G_{y_i}$, respectively, a and b denote the operational parameters, and bias denotes a bias value.

The applications of the sigmoid transfer function to the image interpolation method of the present invention are presented herein for purpose of illustration and description only. The principles of the sigmoid transfer function are well known to those skilled in the art, and are not redundantly described herein. Moreover, the sigmoid transfer function is an example of the transfer function. However, those skilled in the art will readily observe that other kinds of transfer functions may be used in the image interpolation method of the present invention according to the practical requirements. For example, in some other embodiments, the transfer function is a linear function or a hyperbolic tangent function.

For allowing the single-neuron neural network 3 to obtain appropriate horizontal smoothing parameters $\sigma_x$ and appropriate vertical smoothing parameters $\sigma_y$, the step P2 further uses an optimization algorithm to train the bias value bias, the weight $\omega_1$, the weight $\omega_2$, the parameter a and the parameter b of the transfer function. In a preferred embodiment, the optimization algorithm is a particle swarm optimization (PSO) algorithm. Moreover, in the PSO algorithm, a peak signal-to-noise ratio (PSNR) is used as a fitness function to evaluate the quality of the bias value bias, the weight $\omega_1$, the weight $\omega_2$, the parameter a and the parameter b in each generation of the PSO algorithm.

During the training process of the PSO algorithm, a high resolution original image is firstly sampled as a low resolution sample image, then the low resolution sample image is subjected to image interpolation according to the bias value bias, the weight $\omega_1$, the weight $\omega_2$, the parameter a and the parameter b generated in each generation of the PSO algorithm, and finally the interpolated image is compared with the original image. That is, the peak signal-to-noise ratio is used as a basis of comparison between the interpolated image and the original image. The peak signal-to-noise ratio (PSNR) may be expressed by the following formula:

$$PSNR = 10\log_{10}\left(\frac{255^2}{MSE}\right),$$

$$MSE = \frac{1}{K*L}\sum_{k=1}^{K}\sum_{l=1}^{L}(E_{kl} - F_{kl})^2$$

wherein K and L denote the dimensions of the original image, E denotes the gray level of the pixel (k,l) of the original image, and $F_{kl}$ denotes the gray kevel of the pixel (k,l) of the interpolated image. Moreover, a larger PSNR value signifies the bias value bias, the weight $\omega_1$, the weight $\omega_2$, the parameter a and the parameter b corresponding to a better interpolation process. Consequently, by the PSO algorithm used in the image interpolation method of the present invention, the bias value bias, the weight $\omega_1$, the weight $\omega_2$, the parameter a and the parameter b corresponding to the maximum PSNR value can be obtained.

The applications of the PSO algorithm and the PSNR value to the image interpolation method of the present invention are presented herein for purpose of illustration and description only. The principles of the PSO algorithm and the PSNR value are well known to those skilled in the art, and are not redundantly described herein. Moreover, the PSO algorithm is an exemplary way of obtaining the bias value bias, the weight $\omega_1$, the weight $\omega_2$, the parameter a and the parameter b of a better transfer function $f(net)$. However, those skilled in the art will readily observe that other optimization algorithms may be used in the image interpolation method of the present invention according to the practical requirements. For example, in some other embodiments, the optimization algorithm is a genetic algorithm (GA). Moreover, the PSNR value is an exemplary fitness function used in the image interpolation method of the present invention. However, those skilled in the art will readily observe that other fitness functions may be used in the image interpolation method of the present invention according to the practical requirements. For example, in some other embodiments, the fitness function is a percentage edge error (PEE), which is used as a basis of comparison between the interpolated image and the original image.

After the horizontal distance values $x_1 \sim x_{16}$, the vertical distance values $y_1 \sim y_{16}$, the edge direction angles $\theta_1 \sim \theta_{16}$, the horizontal smoothing parameters $\sigma_{x_1} \sim \sigma_{x_{16}}$ and the vertical smoothing parameters $\sigma_{y_1} \sim \sigma_{y_{16}}$ of the sixteen reference points R are obtained, the anisotropic Gaussian function values $f(d_1, \sigma_1) \sim f(d_{16}, \sigma_{16})$ of the sixteen reference points R are obtained by the Gaussian layer 12 and outputted to the weighting layer 13. The weighting layer 13, the summation layer 14 and the division layer 15 are used to perform the center-of-gravity method of the step P3. Consequently, the interpolation value p(U) of the interpolation point A obtained in the step P3 is outputted from the division layer 15. Moreover, the interpolation value p(U) of the interpolation point A obtained by the center-of-gravity method may be expressed by the following formula:

$$p(U) = \frac{\sum_{i=1}^{16} g(X_i) * f(d_i, \sigma_i)}{\sum_{i=1}^{16} f(d_i, \sigma_i)}$$

wherein $g(X_1) \sim g(X_{16})$ indicate the signal values of the sixteen reference points R.

In this embodiment, the signal value of each reference point R denotes the gray value of each reference point R. It is noted that numerous modifications and alterations of the statistics method may be made while retaining the teachings of the invention.

Figure 8:
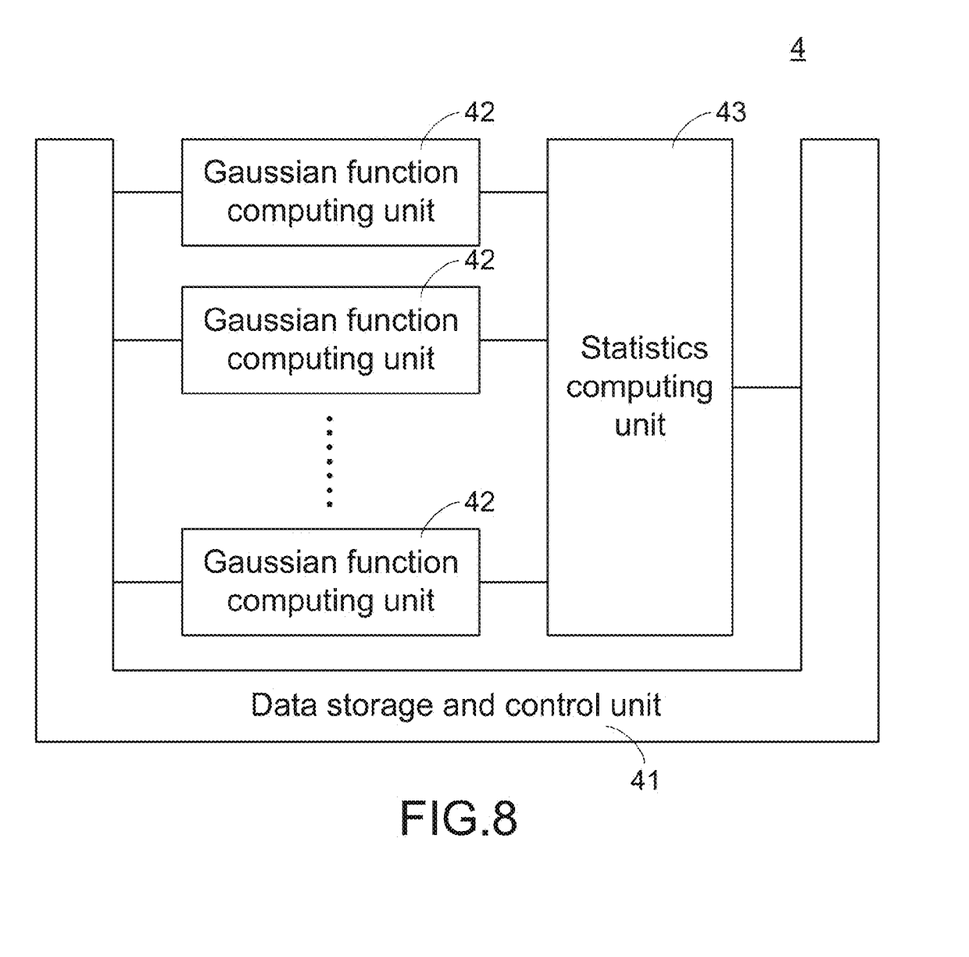
FIG. 8 is a functional block diagram illustrating an image interpolation device using the image interpolation method of FIG. 4.

FIG. 8 is a functional block diagram illustrating an image interpolation device using the image interpolation method of FIG. 4. As shown in FIG. 8, the image interpolation device 4 comprises a data storage and control unit 41, sixteen Gaussian function computing units 42 corresponding to the sixteen reference points R, and a statistics computing unit 43. In a preferred embodiment, the image interpolation device 4 is implemented by a field-programmable gate array (FPGA), but is not limited thereto. However, those skilled in the art will readily observe that the image interpolation device 4 may be implemented by other programmable logic devices or integrated circuits.

Moreover, the data storage and control unit 41 is used to obtain the edge direction angles $\theta_1 \sim \theta_{16}$, the horizontal smoothing parameters $\sigma_{x_1} \sim \sigma_{x_{16}}$ and the vertical smoothing parameters $\sigma_{y_1} \sim \sigma_{y_{16}}$ and the signal values $g(X_1) \sim g(X_{16})$ of the reference points R. For example, after the step P2 of the flowchart as shown in FIG. 4 is performed by the data storage and control unit 41, these edge direction angles $\theta_1 \sim \theta_{16}$, the horizontal smoothing parameters $\sigma_{x_1} \sim \sigma_{x_{16}}$ and the vertical smoothing parameters $\sigma_{y_1} \sim \sigma_{y_{16}}$ are obtained. Alternatively, in some other embodiments, after the step P2 of the flowchart as shown in FIG. 4 is performed by a front-end computing unit (not shown) which is connected with the data storage and control unit 41, these edge direction angles $\theta_1 \sim \theta_{16}$, the horizontal smoothing parameters $\sigma_{x_1} \sim \sigma_{x_{16}}$ and the vertical smoothing parameters $\sigma_{y_1} \sim \sigma_{y_{16}}$ are obtained.

Moreover, all of the Gaussian function computing units 42 are connected with the data storage and control unit 41. Moreover, after the corresponding edge direction angles $\theta_1 \sim \theta_{16}$, the corresponding horizontal smoothing parameters $\sigma_{x_1} \sim \sigma_{x_{16}}$ and the corresponding vertical smoothing parameters $\sigma_{y_1} \sim \sigma_{y_{16}}$ are received by the Gaussian function computing units 42, the anisotropic Gaussian function values $f(d_1, \sigma_1) \sim f(d_{16}, \sigma_{16})$ of the corresponding reference points R are calculated and obtained by the Gaussian function computing units 42. Moreover, these anisotropic Gaussian function values $f(d_1, \sigma_1) \sim f(d_{16}, \sigma_{16})$ are obtained by performing the step P2 of the flowchart as shown in FIG. 4.

In this embodiment, the number of the Gaussian function computing units 42 is identical to the number of the reference points R. In other words, the anisotropic Gaussian function values of the corresponding reference points R may be calculated by these Gaussian function computing units 42 in a parallel processing manner. However, those skilled in the art will readily observe that numerous modifications and alterations may be made according to the practical requirements.

For example, the sixteen reference points R may be divided into four reference point groups. That is, each reference point group comprises four reference points R. Under this circumstance, the image interpolation device 4 only comprises four Gaussian function computing units 42 corresponding to the four reference point groups. After the edge direction angles, the horizontal smoothing parameters and the vertical smoothing parameters of the reference points R of the corresponding reference point group are received by the corresponding Gaussian function computing unit 42, the anisotropic Gaussian function values of the corresponding reference points R may be sequentially calculated by the corresponding Gaussian function computing unit 42 in a serial processing manner. That is, the anisotropic Gaussian function values of four reference points R are calculated and outputted by each Gaussian function computing unit 42. In addition, these four Gaussian function computing unit 42 are simultaneously operated in the parallel processing manner.

In some other embodiments, the image interpolation device 4 comprises a single Gaussian function computing unit 42. After the edge direction angles, the horizontal smoothing parameters and the vertical smoothing parameters of the reference points R are all received by the single Gaussian function computing unit 42, all of the anisotropic Gaussian function values of these reference points R are sequentially calculated by the single Gaussian function computing unit 42 in the serial processing manner. That is, the anisotropic Gaussian function values of the sixteen reference points R are calculated and outputted by the single Gaussian function computing unit 42.

Moreover, the statistics computing unit 43 is connected with the Gaussian function computing units 42 and the data storage and control unit 41. After the anisotropic Gaussian function values $\theta(d_1, \sigma_1) \sim f(d_{16}, \sigma_{16})$ from the Gaussian function computing units 42 and the signal values $g(X_1) \sim g(X_{16})$ from the data storage and control unit 41 are received by the statistics computing unit 43, a statistics method is performed to integrate and compute these anisotropic Gaussian function values $f(d_1, \sigma_1) \sim f(d_{16}, \sigma_{16})$. Consequently, the interpolation value p(U) of the interpolation point A is outputted by the statistics computing unit 43. For example, the interpolation value p(U) of the interpolation point A may be obtained by a center-of-gravity method (e.g. the step P3 of the flowchart as shown in FIG. 4).

Figure 9:
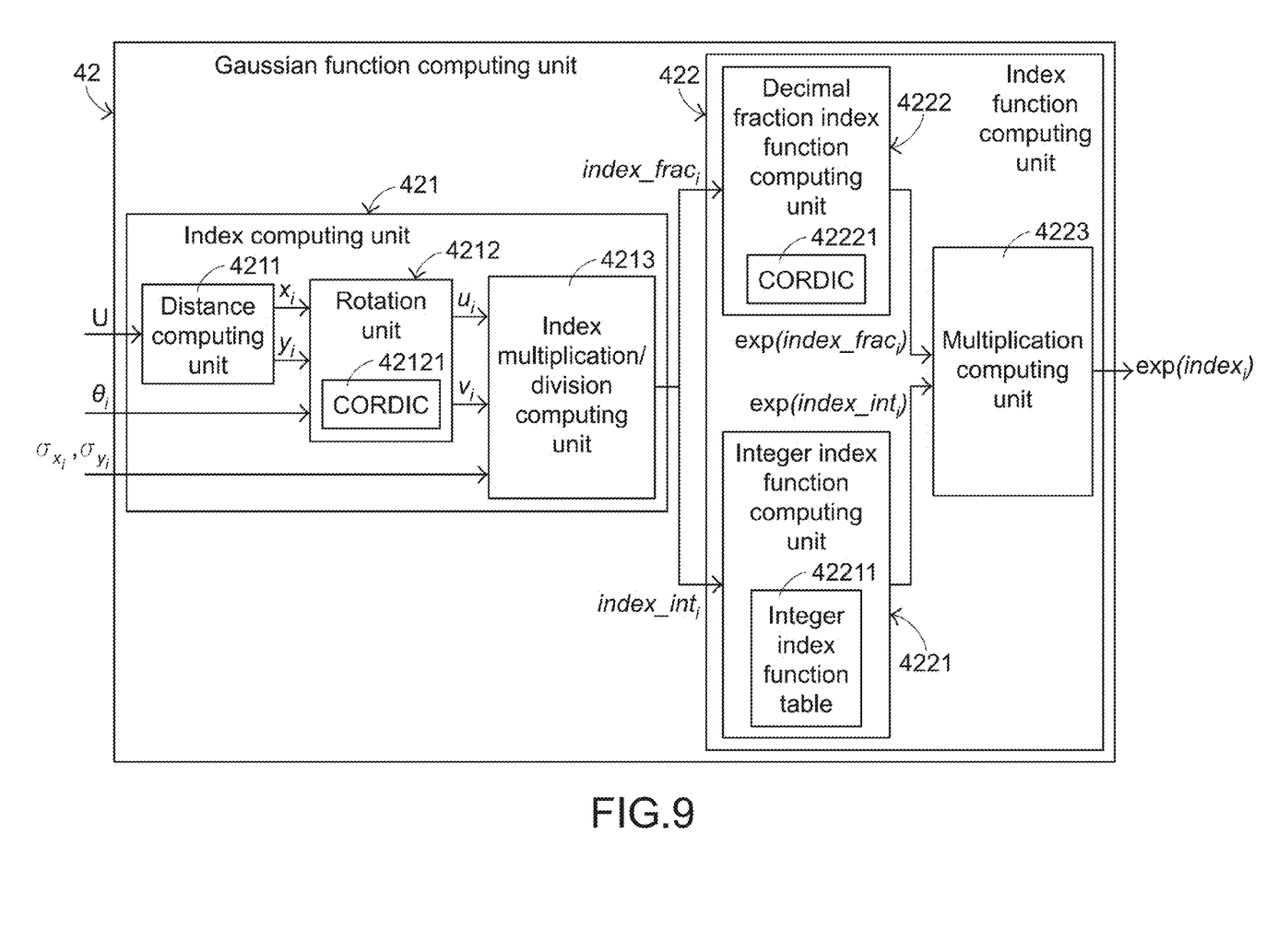
FIG. 9 is a schematic functional block diagram illustrating the data storage and control unit of the image interpolation device of FIG. 8.

FIG. 9 is a schematic functional block diagram illustrating the data storage and control unit of the image interpolation device of FIG. 8. Each Gaussian function computing unit 42 comprises an index computing unit 421 and an index function computing unit 422. Moreover, the index function computing unit 422 is connected between the index computing unit 421 and the statistics computing unit 43. The index computing unit 421 is used for generating and outputting an index value index to the index function computing unit 422. The index value index is an index of the Gaussian function. The index value index may be expressed by the following formula:

$$index_i = -\frac{1}{2}\left(\frac{u_i^2}{\sigma_{x_i}^2} + \frac{v_i^2}{\sigma_{y_i}^2}\right)$$

In this embodiment, the index computing unit 421 comprises a distance computing unit 4211, a rotation unit 4212, and an index multiplication/division computing unit 4213. Moreover, the rotation unit 4212 is connected between the distance computing unit 4211 and the index multiplication/division computing unit 4213. The distance computing unit 4211 is connected with the index computing unit 421 for receiving the position coordinate U of the interpolation point A. Moreover, after the step P2 of the flowchart as shown in FIG. 4 is performed by the Euclidian layer 11, the horizontal distance value $x_i$ and the vertical distance value $y_i$ between the corresponding reference point R and the interpolation point A are generated and outputted by the distance computing unit 4211.

Moreover, the rotation unit 4212 is used for receiving the horizontal distance value $x_i$ and the vertical distance value $y_i$ from the distance computing unit 4211 and receiving the edge direction angle $\theta_i$ from the data storage and control unit 41. Moreover, the horizontal distance value $x_i$ and the vertical distance value $y_i$ are subjected to a coordinate rotation computation according to the edge direction angle $\theta_i$. That is, after the step P2 of the flowchart as shown in FIG. 4 is performed by the Gaussian layer 12, the additional horizontal distance value $u_i$ and the additional vertical distance value $v_i$ are generated and outputted by the rotation unit 4212.

In this embodiment, the rotation unit 4212 comprises a coordinate rotation digital computer (CORDIC) 42121 for performing the coordinate rotation computation. The principles of the rotation unit 4212 are well known to those skilled in the art, and are not redundantly described herein. Moreover, the use of the coordinate rotation digital computer (CORDIC) 42121 to perform the coordinate rotation computation on the horizontal distance value $x_i$ and the vertical distance value $y_i$ is presented herein for purpose of illustration and description only. However, those skilled in the art will readily observe that numerous modifications and alterations may be made while retaining the teachings of the invention.

For example, in some other embodiments, a coordinate rotation table (not shown) is included in the rotation unit 4212. The coordinate rotation table is a relationship table about the relationships between plural horizontal distance values x, plural vertical distance values y, plural edge direction angles θ, plural additional horizontal distance values u and plural additional vertical distance values v. After the horizontal distance value $x_i$ and the vertical distance value $y_i$ from the distance computing unit 4211 and the edge direction angle $\theta_i$ from the data storage and control unit 41 are received by the rotation unit 4212, the corresponding additional horizontal distance value $u_i$ and the corresponding additional vertical distance value $v_i$ may be directly obtained by looking up the coordinate rotation table and then outputted.

For example, in some other embodiments, the rotation unit 4212 uses a Taylor series expansion to perform the coordinate rotation computation on the horizontal distance value $x_i$ and the vertical distance value $y_i$. The principles of the Taylor series expansion are well known to those skilled in the art, and are not redundantly described herein. Alternatively, in some other embodiments, the rotation unit 4212 uses the coordinate rotation table and the Taylor series expansion simultaneously to perform the coordinate rotation computation on the horizontal distance value $x_i$ and the vertical distance value $y_i$. Alternatively, in some other embodiments, the rotation unit 4212 uses the coordinate rotation table and the coordinate rotation digital computer (CORDIC) 42121 simultaneously to perform the coordinate rotation computation on the horizontal distance value $x_i$ and the vertical distance value $y_i$.

Moreover, the index multiplication/division computing unit 4213 is used for receiving the additional horizontal distance value $u_i$ and the additional vertical distance value $v_i$ from the rotation unit 4212 and receiving the horizontal smoothing parameter $\sigma_{x_i}$ and the corresponding vertical smoothing parameter $\sigma_{y_1}$ from the data storage and control unit 41, thereby generating and outputting the corresponding index value $index_i$. Moreover, the index value $index_i$ may be divided into an integer index value index_$int_i$ and a decimal fraction index value index_$frac_i$.

The index function computing unit 422 comprises an integer index function computing unit 4221, a decimal fraction index function computing unit 4222, and a multiplication computing unit 4223. The multiplication computing unit 4223 is connected with the integer index function computing unit 4221 and the decimal fraction index function computing unit 4222. The integer index function computing unit 4221 is used for receiving the integer index value index_$int_i$, thereby generating and outputting an integer index function value exp(index_$int_i$). The decimal fraction index function computing unit 4222 is used for receiving the decimal fraction index value index_$frac_i$, thereby generating and outputting a decimal fraction index function value exp(index_$frac_i$). The multiplication computing unit 4223 is used for receiving the integer index function value exp(index_$int_i$) and the decimal fraction index function value exp(index_$frac_i$), and calculating the product exp(index_$i$) of the integer index function value exp(index_$int_i$) and the decimal fraction index function value exp(index_$frac_i$), thereby generating and outputting the anisotropic Gaussian function value $f(d_i, \sigma_i)$. For illustration and hardware simplification, in this embodiment, the anisotropic Gaussian function value $f(d_i, \sigma_i)$ may be simplified as the following formula:

$$f(d_i, \sigma_i) = g_\theta(x_i, y_i, \sigma_{x_i}, \sigma_{y_i}, \theta_i) = e^{-\frac{1}{2}\left(\frac{u_i^2}{\sigma_{x_i}^2} + \frac{v_i^2}{\sigma_{y_i}^2}\right)}$$

In a preferred embodiment, the integer index function computing unit 4221 has an integer index function table 42211. The integer index function table 42211 is a relationship table about the relationships between plural integer index values index_int and plural integer index function values exp(index_int). After the integer index value index_$int_i$ is received by the integer index function computing unit 4221, the corresponding integer index function value exp(index_$int_i$) may be directly obtained by looking up the integer index function table and then outputted.

Moreover, in this embodiment, the decimal fraction index function computing unit 4222 comprises a coordinate rotation digital computer (CORDIC) 42221. After the decimal fraction index value index_frac$_i$ is received by the decimal fraction index function computing unit 4222, the coordinate rotation digital computer (CORDIC) 42221 performs an index computation on the decimal fraction index value index_frac$_i$. Consequently, the decimal fraction index function value exp(index_frac$_i$) is obtained. The principles of the coordinate rotation digital computer (CORDIC) 42221 are well known to those skilled in the art, and are not redundantly described herein. Moreover, the use of the coordinate rotation digital computer (CORDIC) 42221 to perform the index computation is presented herein for purpose of illustration and description only. However, those skilled in the art will readily observe that numerous modifications and alterations may be made while retaining the teachings of the invention.

For example, in some other embodiments, a decimal fraction index function table (not shown) is included in the decimal fraction index function computing unit 4222. The decimal fraction index function table is a relationship table about the relationships between plural decimal fraction index values index_frac and plural decimal fraction index function values exp(index_frac). After the decimal fraction index value exp(index_frac$_i$) is received by the decimal fraction index function computing unit 4222, the corresponding decimal fraction index function value exp(index_frac$_i$) may be directly obtained by looking up the decimal fraction index function table and then outputted.

Moreover, in some other embodiments, the decimal fraction index function computing unit 4222 uses a Taylor series expansion to perform the index computation. The principles of the Taylor series expansion are well known to those skilled in the art, and are not redundantly described herein. Alternatively, in some other embodiments, the decimal fraction index function computing unit 4222 uses the decimal fraction index function table and the Taylor series expansion simultaneously to perform the index computation. Alternatively, in some other embodiments, the decimal fraction index function computing unit 4222 uses the decimal fraction index function table and the coordinate rotation digital computer (CORDIC) 42221 simultaneously to perform the index computation.

As known, if the index computation is performed on some of the integer index values by the coordinate rotation digital computer (CORDIC) 42221, an error to a certain extent is generated. In accordance with the present invention, the index value integer index value index_int$_i$ and the decimal fraction index value index_frac$_i$, and the corresponding integer index function value exp(index_int$_i$) may be directly obtained by looking up the integer index value index_int$_i$ the integer index function table. Consequently, the precision of computation may be reduced to 6.08 e$^{-5}$ or less.

From the above discussions, the interpolation value of the interpolation point A of the target image 2 is obtained by interpolating the anisotropic Gaussian function value $f(d_i,\sigma_i)$ of each reference point R of the plural reference points R neighboring the interpolation point A according to a statistics method. In addition, the anisotropic Gaussian function value $f(d_i,\sigma_i)$ of each reference point R contains the image characteristics of each reference point R. That is, the interpolation value p(U) of the interpolation point A is obtained by integrating and computing the edge direction angle $\theta_i$ the horizontal smoothing parameter $\sigma_x$ and the vertical smoothing parameter $\sigma_y$. Consequently, the interpolation value p(U) of the interpolation point A obtained by the image interpolation method of the present invention is very close to the image edge characteristics such as an edge intensity or an edge angle.

Figure 10A:
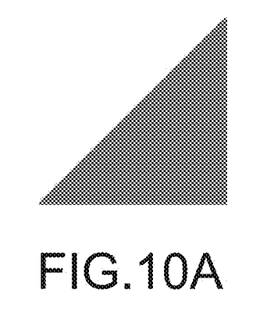
FIGS. 10A to 10B schematically illustrate some image interpolation results obtained by the adaptive interpolation of the image interpolation method and the image interpolation device of the present invention.
Figure 10B:
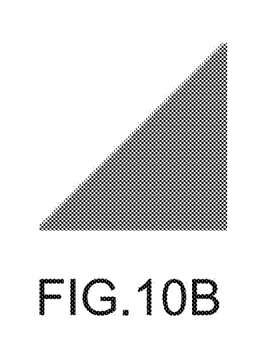

FIG. 10 schematically illustrates some image interpolation results obtained by the adaptive interpolation of the image interpolation method and the image interpolation device of the present invention. In FIG. 10A, a high resolution original image is shown. After the high resolution original image is sampled as a low resolution sample image, an adaptive edge interpolation is performed on the low resolution sample image by the image interpolation method of FIG. 4 and the image interpolation device 4 of FIG. 8, so that the interpolated image of FIG. 10B is generated. As shown in FIG. 10B, there are no obvious aliasing and blocking effects at the edge region of the interpolated image. Moreover, in the interpolated image, the sharpness is satisfactory and the edge feature is retained. Consequently, the defocus problem of the interpolated image during image visualization is minimized.

Figure 11:
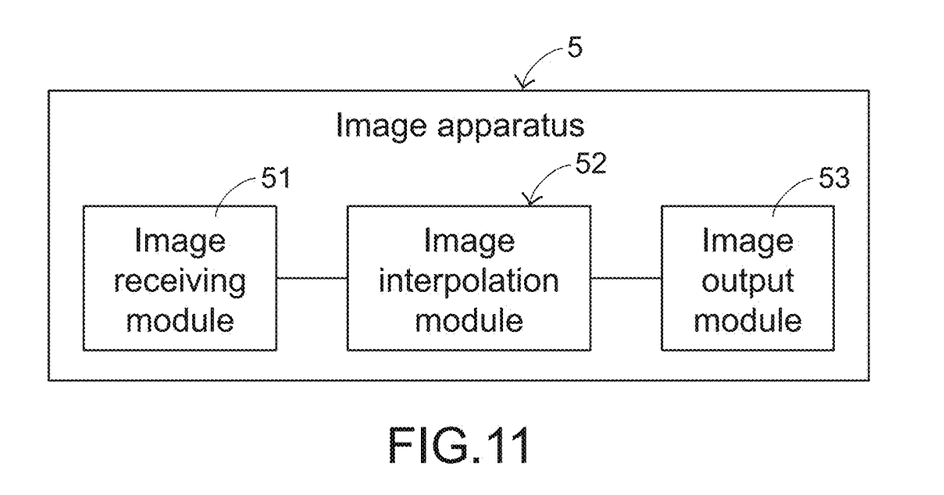
FIG. 11 is a schematic functional block diagram illustrating an image apparatus with an image interpolation function according to an embodiment of the present invention.

FIG. 11 is a schematic functional block diagram illustrating an image apparatus with an image interpolation function according to an embodiment of the present invention. As shown in FIG. 11, the image apparatus 5 comprises an image receiving module 51, an image interpolation module 52, and an image output module 53. The image interpolation module 52 is connected between the image receiving module 51 and the image output module 53. The image receiving module 51 is used for receiving the target image 2 and transmitting the target image 2 to the image interpolation module 52. In an embodiment, the image interpolation module 52 is the image interpolation device 4 as shown in FIG. 8. The interpolation module 52 is used to perform an adaptive interpolation on the object image 2, thereby generating an interpolated image. In addition, the interpolated image is transmitted from the interpolation module 52 to the image output module 53. Afterwards, the interpolated image is outputted from the image output module 53.

In an embodiment, the image apparatus 5 is a multimedia transmission device such as a multimedia gateway or a digital set-top box. Under this circumstance, since the image apparatus 5 has a satisfactory image interpolation function, a purpose of reducing the communication bandwidth can be achieved. That is, the image supply terminal (not shown) of the object image 2 only needs to provide a low resolution object image 2 to the communication network. Under this circumstance, the load of the communication network is reduced, and the image transmission speed is enhanced. Moreover, after the low resolution object image 2 is received and an adaptive interpolation is performed by the image apparatus 5, the image apparatus 5 outputs a high resolution interpolated image to a multimedia playback device which is connected with the multimedia transmission device. As a consequence, the high resolution image can be watched by the user.

Alternatively, the image apparatus 5 is a video scaler included in a multimedia playback device (e.g. a flat display device). That is, the interpolated image from the image apparatus 5 may be directly played by the multimedia playback device.

Moreover, the image apparatus 5 may be included in an image pickup device such as a camera or a video camera. Under this circumstance, the image captured by the image pickup device does not need to have the high resolution. The reason is that the built-in image apparatus 5 can perform an image interpolation on the image and then output the interpolated image. In this situation, it is not necessary to install a high level charge-coupled device (CCD) or a high level complementary metal-oxide-semiconductor (CMOS). Consequently, the fabricating cost is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image apparatus with an image interpolation function, the image apparatus comprising:
an image receiving module for receiving a target image;
an image interpolation module connected with the image receiving module for using a probabilistic neural network model to perform an adaptive interpolation on at least one interpolation point of the object image, thereby generating an interpolated image, wherein the image interpolation module comprises:
a data storage and control unit for obtaining edge direction angles, horizontal smoothing parameters and vertical smoothing parameters of plural reference points neighboring the at least one interpolation point;
at least one Gaussian function computing unit connected with the data storage and control unit for obtaining an anisotropic Gaussian function value of each reference point of the plural reference points according to the corresponding edge direction angle, the corresponding horizontal smoothing parameter, the corresponding vertical smoothing parameter and a distance between each reference point and the interpolation point; and
a statistics computing unit connected with the Gaussian function computing unit for performing a statistics method to integrate and compute the anisotropic Gaussian function values of the plural reference points, thereby generating and outputting an interpolation value of the interpolation point; and
an image output module connected with the image interpolation module for outputting the interpolated image,
wherein the at least one Gaussian function computing unit comprises plural Gaussian function computing units corresponding to the plural reference points, wherein each of the plural Gaussian function computing units obtains the anisotropic Gaussian function value of the corresponding reference point according to the corresponding edge direction angle, the corresponding horizontal smoothing parameter, the corresponding vertical smoothing parameter and the distance between the corresponding reference point and the interpolation point; or
wherein the plural reference points are divided into plural reference point groups, and the at least one Gaussian function computing unit comprises plural Gaussian function computing units corresponding to the plural reference point groups, wherein each of the plural Gaussian function computing units obtains the anisotropic Gaussian function values of the reference points of the corresponding reference point group according to the corresponding edge direction angles, the corresponding horizontal smoothing parameters, the corresponding vertical smoothing parameters and the distances between the corresponding reference points and the interpolation point; or
wherein the at least one Gaussian function computing unit comprises a single Gaussian function computing unit, and the single Gaussian function computing unit obtains the anisotropic Gaussian function values of the plural reference points sequentially according to the corresponding edge direction angles, the corresponding horizontal smoothing parameters, the corresponding vertical smoothing parameters and the distances between the corresponding reference points and the interpolation point.

2. The image apparatus according to claim 1, wherein the image apparatus with the image interpolation function is a digital set-top box, a multimedia gateway or a multimedia transmission device, or the image apparatus with the image interpolation function is included in a multimedia playback device or an image pickup device.

3. The image apparatus according to claim 1, wherein each Gaussian function computing unit of the at least one Gaussian function computing unit comprises an index computing unit and an index function computing unit, wherein the index function computing unit is connected between the index computing unit and the statistics computing unit, wherein the index computing unit generates and outputs an index value to the index function computing unit.

4. The image apparatus according to claim 3, wherein the index computing unit comprises a distance computing unit, wherein the distance computing unit is connected with the index computing unit for receiving a position coordinate of the at least one interpolation point, thereby generating and outputting a horizontal distance value and a vertical distance value between the corresponding reference point and the at least one interpolation point.

5. The image apparatus according to claim 3, wherein the index computing unit comprises a rotation unit for receiving a horizontal distance value, a vertical distance value and an edge direction angle, and performing a coordinate rotation computation according to the edge direction angle, so that the horizontal distance value is transformed into an additional horizontal distance value and the vertical distance value is transformed into an additional vertical distance value.

6. The image apparatus according to claim 5,
wherein the rotation unit comprises a coordinate rotation digital computer (CORDIC) for performing the coordinate rotation computation; or
wherein the rotation unit has a coordinate rotation table, and the rotation unit performs the coordinate rotation computation according to the coordinate rotation table; or
wherein the rotation unit performs the coordinate rotation computation according to a Taylor series expansion; or
wherein the rotation unit has the coordinate rotation table, and the rotation unit performs the coordinate rotation computation according to the coordinate rotation table and the Taylor series expansion; or
wherein the rotation unit comprises the coordinate rotation digital computer and the coordinate rotation table, and the rotation unit performs the coordinate rotation computation according to the coordinate rotation digital computer and the coordinate rotation table.

7. The image apparatus according to claim 3, wherein the index function computing unit comprises an integer index function computing unit, a decimal fraction index function computing unit, and a multiplication computing unit, wherein the multiplication computing unit is connected with the integer index function computing unit and the decimal fraction index function computing unit, and the index value is divided into an integer index value and a decimal fraction index value, wherein the integer index function computing unit receives the integer index value and generates an integer index function value, the decimal fraction index function computing unit receives the decimal fraction index value and generates a decimal fraction index function value, and the multiplication computing unit receives the integer index function value and the decimal fraction index function value and generates a product of the integer index function value and the decimal fraction index function value.

8. The image apparatus according to claim 7, wherein the integer index function computing unit has an integer index function table, wherein after the integer index value is received by the integer index function computing unit, the integer index function computing unit generates and outputs the integer index function value according to the integer index function table.

9. The image apparatus according to claim 7,
wherein the decimal fraction index function computing unit comprises a coordinate rotation digital computer (CORDIC) for performing an index computation after the decimal fraction index value is received by the decimal fraction index function computing unit; or
wherein the decimal fraction index function computing unit has a decimal fraction index function table, and the decimal fraction index function computing unit generates and outputs the decimal fraction index function value according to the decimal fraction index function table after the decimal fraction index value is received; or
wherein the decimal fraction index function computing unit generates and outputs the decimal fraction index function value according to a Taylor series expansion after the decimal fraction index value is received; or
wherein the decimal fraction index function computing unit has the decimal fraction index function table, and the decimal fraction index function computing unit generates and outputs the decimal fraction index function value according to the decimal fraction index function table and the Taylor series expansion after the decimal fraction index value is received; or
wherein the decimal fraction index function computing unit comprises the coordinate rotation digital computer (CORDIC) and the decimal fraction index function table, and the decimal fraction index function computing unit generates and outputs the decimal fraction index function value according to the index computation of the coordinate rotation digital computer (CORDIC) and the decimal fraction index function table.

* * * * *